United States Patent

[11] 3,524,447

| [72] | Inventors | Robert P. Evans<br>Kenmore, New York;<br>Edward G. Dykstra, East Aurora, New York; Richard R. Van Geem, Kenmore, New York |
|---|---|---|
| [21] | Appl. No. | 361,321 |
| [22] | Filed | April 6, 1964 |
| [45] | Patented | Aug. 18, 1970 |
| [73] | Assignee | Sterilon Corporation<br>Buffalo, New York |

[54] METHOD OF MAKING A RIGID TIPPED POLYVINYL CATHETER
2 Claims, No Drawings

[52] U.S. Cl..................................................... 128/348,
264/232,341
[51] Int. Cl...................................................... A61m25/00,
B29c 25/00

[50] Field of Search........................................... 264/232,
340, 341; 128/348-351, 227-241; 138/Inq.

[56] References Cited
UNITED STATES PATENTS

| 2,211,975 | 8/1940 | Hendrickson................ | 128/349 |
| 2,667,875 | 2/1954 | Wallace........................ | 128/349 |

*Primary Examiner*— Dalton L. Truluck
*Attorney*— Bean, Brooks, Buckley and Bean

ABSTRACT: A method of making a rigid tipped catheter by immersing approximately 1½ inches of a length of extruded polyvinyl tubing in a mixed solution of toluene and acetone, the mixture containing 30% by volume of acetone. The tip portion is soaked for 30 minutes, air dried and allowed to age for about one week, whereupon the tip portion will display sufficient rigidity to permit insertion thereof into a body passageway in a normal fashion.

METHOD OF MAKING A RIGID TIPPED POLYVINYL CATHETER

This invention relates to medico-surgical apparatus and is directed in particular to an improved form of catheter tube and the method of making same.

In the catheter tube art, it is frequently desirable to provide, in association therewith, a rigid tip for facilitating insertion. For example, such a tip is useful in conjunction with an enema dispensing tube. According to prior art practice, the flexible catheter tube of such a dispensing unit is provided with a separate tip element having the requisite rigidity. Such separate entities are required inasmuch as the tube proper must be substantially flexible in order to accommodate for normal usage of the device, much more flexible than the insertion tip portion. For many reasons, and in particular in conjunction with disposable units wherein cost factors are of elementary importance, any such separate tip construction is objectionable. It is, therefore, of primary concern in connection with this invention to provide an improved form of catheter tube, and method of making the same, in which a tip portion of an integral tube construction is preferentially stiffened or rigidized so as to eliminate the necessity for providing an insertion tip of separate manufacture.

More specifically, it is an object of this invention to provide an improved method of making a catheter of polyvinyl material having an integral tip portion which has been rigidized for facilitating insertion thereof into a body passageway.

The method according to this invention involves the soaking and subsequent drying and aging of a tip portion of a polyvinyl tube to preferentially rigidize such tip portion. In particular, it has been found that if the portion of the polyvinyl tubing which is desired to be stiffened is soaked for a sufficient time in a mixture of toluene and acetone, permitted to dry and subsequently aged for a sufficient time, such portion of the tubing will display very little flexibility, without detracting from the flexibility characteristics of the remainder of the tubing, so as to adapt such portion to be employed as an insertion tip. Thus, as little or as much of the tip portion of the polyvinyl tubing may be preferentially rigidized by a relatively simple and inexpensive expedient without resorting to modifications of existing techniques to accommodate therefor.

Thus, conventional tube forming techniques may be employed. For example, a length of extruded polyvinyl tubing may be heat sealed at one end and provided with one or more lateral openings to produce a tip formation such as is shown in Patent 2,856,932, issued October 21, 1958. Alternatively, other and different types of tips may be employed such as the so-called "open end" tip. In any event, subsequent to the actual formation of the tube construction, the desired tip form is preferentially rigidized in accord with the method of this invention. Moreover, the degree of rigidity imparted may be varied, within practical limits, by adjusting the immersion time in the soaking liquid.

An illustrative example of the present method is as follows:

A length of extruded polyvinyl tubing is sealed at one end and provided with a series of lateral openings adjacent such sealed end, in accord with conventional formation of an enema dispensing tip. Approximately 1½ inches of this tip portion, sufficient to encompass the sealed end and that body portion of the tubing within which the aforesaid openings are formed, are immersed in a mixture of toluene and acetone, the mixture containing 30% by volume of acetone. The tip portion is allowed to soak for 30 minutes and is then air dried and permitted to age for about one week, at which time the tip portion will display sufficient rigidity to facilitate insertion thereof in normal fashion.

It is to be understood that certain changes and modifications as illustrated and described may be made without departing from the spirit of the invention or the scope of the following claims.

We claim:
1. The method of making a catheter tube which comprises:
   forming a length of tubing from a polyvinyl material;
   forming one end of such tubing into an insertion tip; and
   soaking such tip in a solution of toluene and acetone, drying said tip and aging the same until the tip is rigidized.
2. The method of making a catheter tube which comprises:
   heat sealing one end of a length of flexible polyvinyl tubing and forming a lateral discharge opening adjacent thereto;
   soaking said one end in a solution of toluene and acetone for about 30 minutes; and
   drying said one end and aging the tube for about one week.